No. 792,416. PATENTED JUNE 13, 1905.
G. HACKER.
INCUBATOR.
APPLICATION FILED AUG. 8, 1904.

2 SHEETS—SHEET 1.

ATTEST
A. J. McCauley.
Alfred Eus

INVENTOR:-
George Hacker
BY Higdon Longan Hopkins
ATTY'S

No. 792,416. PATENTED JUNE 13, 1905.
G. HACKER.
INCUBATOR.
APPLICATION FILED AUG. 8, 1904.

2 SHEETS—SHEET 2.

ATTEST
A. J. McCauley.
Alfred Eins

INVENTOR:—
George Hacker
BY Higdon Longan Hopkins
ATTY'S.

No. 792,416. Patented June 13, 1905.

UNITED STATES PATENT OFFICE.

GEORGE HACKER, OF ST. LOUIS, MISSOURI, ASSIGNOR TO HACKER INCUBATOR & MANUFACTURING COMPANY, OF ST. LOUIS, MISSOURI, A CORPORATION OF MISSOURI.

INCUBATOR.

SPECIFICATION forming part of Letters Patent No. 792,416, dated June 13, 1905.

Application filed August 8, 1904. Serial No. 219,933.

*To all whom it may concern:*

Be it known that I, GEORGE HACKER, a citizen of the United States, and a resident of St. Louis, Missouri, have invented certain new and useful Improvements in Incubators, of which the following is a specification containing a full, clear, and exact description, reference being had to the accompanying drawings, forming a part hereof.

My invention relates to improvements in incubators and comprises the novel features herein shown, described, and claimed.

Figure 1:
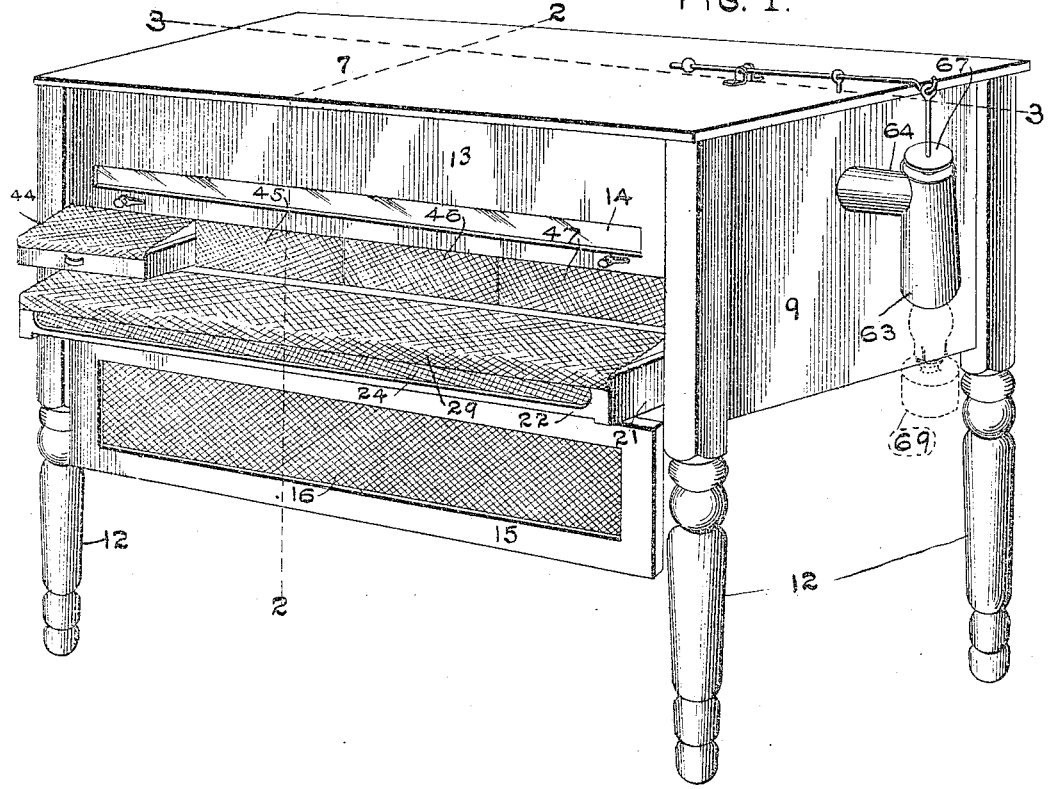
Figure 2:
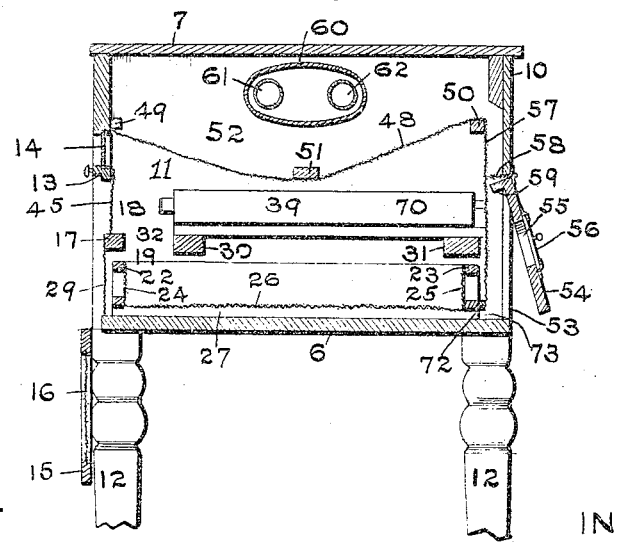
Figure 3:
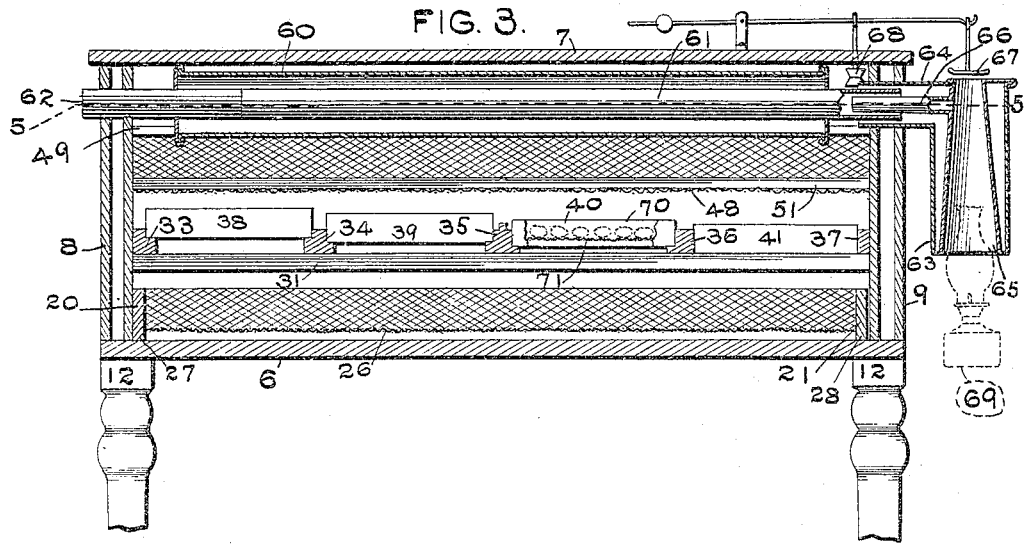
Figure 4:
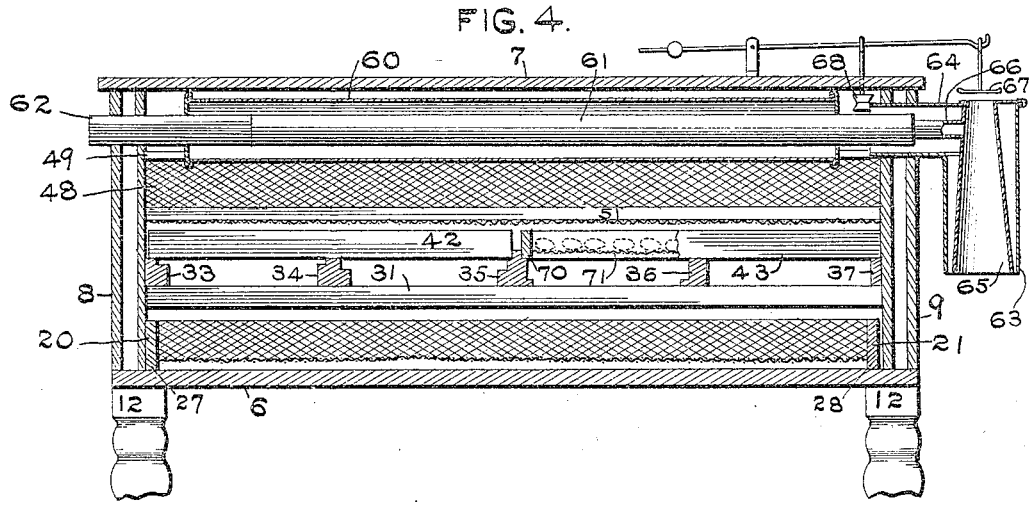
Figure 5:
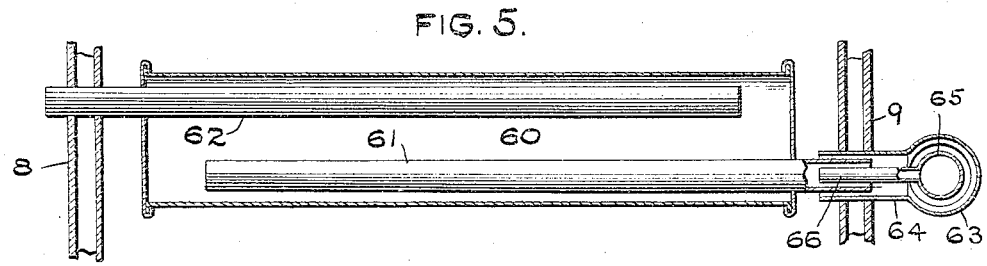

In the drawings, Figure 1 is a perspective of an incubator embodying the principles of my invention and showing the operation. Fig. 2 is a cross-section approximately on the line 2 2 of Fig. 1. Fig. 3 is a longitudinal section approximately on the line 3 3 of Fig. 1. Fig. 4 is a view analogous to Fig. 3 and showing a transformation with reference to the trays. Fig. 5 is a horizontal sectional detail on the line 5 5 of Fig. 3 and looking downwardly.

Referring to the drawings in detail, the means of forming the incubator-chamber comprises the bottom 6, the top 7, the ends 8 and 9, and the back 10, all secured together in the form of a box containing the incubator-chamber 11, said box being mounted upon legs 12.

The front side of the incubator-chamber is closed by a window-frame 13, the glass 14 in the window-frame, the door-frame 15, hinged at its lower edge so as to swing up to the window-frame, and the cloth panel 16 in said door. A horizontal parting-strip 17 is mounted at the center of the door-opening, thus dividing the door-opening into the egg-tray opening 18 and the chicken-tray opening 19. The chicken-tray comprises the ends 20 and 21, the front frame 22 and the rear frame 23, the cloth panels 24 and 25 upon the front and rear frames, the cloth floor 26, secured to the sides and ends, and the supports 27 and 28, resting upon the bottom 6 and holding the cloth floor elevated from the bottom. A strip of cloth 29 is secured to the front face of the parting-strip 17 to close the chicken-tray opening 19, like a door.

The egg-tray-supporting sills 30 and 31 are mounted parallel with the parting-strip 17, the upper faces of said sills being substantially on a level with the upper faces of the parting-strip and there being an opening 32 between the parting-strip 17 and the sill 30, said opening extending the entire length of the incubator-chamber 11. Egg-tray guide-strips 33, 34, 35, 36, and 37 are mounted upon the sills 30 and 31 crosswise of said sills, so as to support and guide the egg-trays 38, 39, 40, and 41, the supporting-surfaces of said guides being graduated in height so that starting with the egg-tray 38 each egg-tray is successively lower than the preceding one, as shown in Fig. 3. These guide-strips also have supporting-surfaces adapted to receive egg-trays 42 and 43, as shown in Fig. 4, said trays 42 and 43 being approximately twice as large as either of the trays shown in Fig. 3.

By substituting the trays the eggs may be handled in large or small batches, as desired. Strips of cloth 44, 45, 46, and 47 are attached to the inner face of the window-frame 13 and at its lower edge, so as to form doors and close the egg-tray opening 18, there being one door for each of the small trays.

The foraminous heat-distributing wall 48, preferably of cloth, is mounted above the egg-trays and attached to the front strip 49, the rear strip 50, and the central strip 51, so as to form the heating-chamber 52 above the incubator-chamber 11. The strips 49 and 50 are substantially on a level, and the strip 51 is somewhat below said strips 49 and 50, so that the foraminous wall 48 is inclined upwardly both ways from strip 51. A door-opening 53 is formed in the lower part of the back 10, said door-opening being normally closed by a door 54, and a draft-opening 55 in the door is regulated by the adjustable shutter 56. A foraminous wall 57, of cloth or wire-gauze, is inserted parallel with the back 10 and extends from the strip 50 to near the bottom 6. A foraminous wall 58 is inserted horizontally from the upper side of the door-opening 53 to the wall 57. A flange 59 extends inwardly from the upper edge of the door 54 under the foraminous wall 58, so that when the door is closed the flange stops the passage of air upwardly through the wall 58 and stops the passage of heat downwardly through said wall 58. A heating-drum 60 is mounted in the upper central part of the heating-chamber 52, said drum being oval in cross-section. An inlet-pipe 61 is mounted in the drum 60 and extends outwardly through the end wall 9, and an outlet-pipe 62 is mounted in the drum and extends outwardly through the end of wall 8. A fresh-air shell 63 is mounted outside of the wall 9, and a nipple 64 extends from the upper end of the shell through the wall 9 and communicates with the heating-chamber 52. The smoke-shell 65 is mounted within the fresh-air shell 63, and a nipple 66 leads from the upper end of the smoke-shell inside of the nipple 64 and discharges into the inlet-pipe 61. A valve 67 is mounted above the shell 65 to regulate the passage through said shell to the open air, said shell being controlled by a thermostat 68. A lamp 69 (shown in dotted lines) is mounted in position to discharge heat and smoke and gases into the shell 65. The receiving end of the pipe 61 is mounted loosely in the nipple 64, and the nipple 66 is mounted loosely in the receiving end of the pipe, so that the hot fresh air may pass upwardly inside of the shell 63, outside of the shell 65 through the nipple 64, both into the air-pipe 61 and into the heating-chamber 52, and so that the smoke, gases, and hot air passing upwardly through the shell 65 will pass through the nipple 66 into the pipe 61 and into the drum 60 in proportion to the position of the valve 67, said position being controlled by the thermostat. Normally the valve 67 will be quite or nearly closed and all the hot gases will pass into the drum; but as the heating-chamber becomes warm and there is danger of overheating the eggs the thermostat will open the valve 67 and allow the surplus heat to escape. The heating-drum 60 is closed at both ends, so that the gases passing inwardly through the pipe 61 can only escape through the pipe 62.

The egg-trays comprise a rectangular frame 70 and a foraminous bottom 71, preferably of cloth.

The angle of the foraminous wall 48 upon each side of the strip 51 must be varied to suit the different heaters and to suit the conditions, and I am unable to give a definite angle that will suit all incubators.

When the heat-supply consists of a hot blast, the angle will be only comparatively slight, whereas if the heat supplied is reduced in force, or what is known as "dead" heat, the angles of the wall must be greatly increased. The hottest air from the heating-chamber will pass through that part of the foraminous wall 48 which is the highest, and the coldest air from said chamber will pass through that part of the wall which is the lowest, and by properly regulating the location of the wall a steady uniform heat may be imparted to the incubating-chamber.

The door 54 is principally useful in constructing the incubator and in regulating the draft. The foraminous wall 57 will protect the egg-trays and chicken-tray from the draft of cold air admitted through the door-opening or through the draft-opening and will allow a constant limited flow of fresh air to the incubating-chamber. The cloth panel 16 provides means of escape for all the air and gases which pass through the incubator.

I prefer that all of the foraminous walls should be constructed of suitable cloth which will permit a gradual widely-distributed flow of air and which will effectually break all drafts of sufficient force to chill the eggs or chicks. It is possible, however, that wire-gauze might be substituted in some of the places, such as the walls 57 and 58.

When it is desired to remove or insert the chicken-tray from the incubator for any purpose, the tray is drawn outwardly through the opening 19, and the cloth strip 29 will drag over and on the tray, passing harmlessly over the chickens in the tray and form a check-valve to prevent cold air from rushing into the incubator-chamber and chilling the eggs in the egg-trays. As soon as the chicken-tray is entirely withdrawn or inserted the cloth 29 will close the opening 19.

When it is desired to remove or insert one of the egg-trays, the corresponding cloth strip will drag over and on the top of the tray and on top of the eggs and cover the eggs and serve as a check-valve to prevent the cold air from rushing into the incubator-chamber.

I have found by actual experiment that the operation of removing or replacing the chicken-tray or one of the egg-trays will not reduce the temperature of the incubating-chamber more than one or two degrees and that this will not stop the process of hatching or injure the chicks or the eggs in the least.

The object of graduating the means of supporting the egg-trays, as shown in Figs. 3 and 4, is to provide means of getting the eggs farther from the heat as the process of hatching proceeds.

The object of using small trays is to provide means of handling the eggs in small batches. When the incubator is started, a single small batch of eggs may be placed in a tray upon the highest guide-strips, and when desired this tray may be removed and placed upon the next lower guide-strips and a new tray inserted in its place, and so on indefinitely.

It is a well-known fact that eggs should not be kept two or three weeks before being placed in the incubator, and by my construction it is possible to place the eggs in the incubator a few at a time as fast as they are produced.

When the chickens hatch and become strong enough, they will fall from the egg-tray into the chicken-tray through opening 32. The progress of the hatching operation may be watched through the glass window 14. When all the eggs have hatched that will hatch in a tray, the tray may be removed and cleaned, the other trays moved down a notch, and this tray filled with a new batch of eggs and placed at the starting-point.

Heretofore the manufacturers of incubators have claimed that if the incubator-door is opened while the chickens are hatching the moisture will escape from the incubator and that the chicks will be chilled and killed. I have found by actual experience that where the incubator-chamber was provided with a door as large as the egg-tray and that if the egg-tray was removed through this door the chamber would become filled with cold air and that it took an hour to again raise the temperature to the proper point, and I have repeatedly watched this operation, and I find that no chicks will pip the shells during the time that the temperature is down and that the moisture of the eggs escaped and the chickens dried to the shells. It is to overcome this trouble that I have made my invention, and I find that my machine has been a success.

The lower edge of the foraminous wall 57 is attached to a strip 72, thereby leaving an air-passage 73, leading from the door-opening 53 under the chicken-tray, so that fresh air passing through the door-opening 53 will readily pass under the chicken-tray.

If the incubator is to be placed with its back against a wall, so that it is inconvenient to open the door 54, and thereby regulate the draft of fresh air, the shutter 56 may be operated from either end of the incubator.

I claim—

1. In an incubator: a suitable inclosure having doors on opposite sides; a foraminous wall mounted inside of one door and cloth hung inside of the other door; said cloth serving as a check-valve when the trays are removed or inserted.

2. In an incubator: a suitable structure having openings in opposite sides, and having an incubator-chamber; and foraminous material on the two open sides of the incubator-chamber and at the top and bottom, to check the draft and admit fresh air to the incubator-chamber.

3. In an incubator: a suitable structure having an incubator-chamber; cloth walls surrounding said chamber; a door for regulating the admission of air to the incubator-chamber; and a door having a cloth panel.

4. In an incubator; a suitable structure having an incubator-chamber, and having a heating-chamber above the incubator-chamber; a cloth wall between the two chambers; a heating-drum in the heating-chamber; an air-inlet pipe extending into the heating-drum; an outlet-pipe extending out of the heating-drum; a fresh-air shell mounted outside of the incubator; a nipple extending from the fresh-air shell into the heating-chamber; a smoke-shell through the first nipple into the air-inlet pipe of the heating-drum; and means of regulating the hot air.

5. In an incubator: a framework having an opening; a door for closing said opening; trays adapted to be inserted and removed through said opening; and cloth hung in said opening in position to drag over and on the trays and drag over and on the eggs and serve as a check-valve when the trays are removed or inserted.

6. In an incubator; a suitable structure having an incubator-chamber; and having an opening for the removal and insertion of egg-trays; egg-trays mounted in the incubator-chamber; and a cloth hung in said opening to drag over and on the egg-trays, and drag over and on the eggs and serve as a check-valve when the trays are removed or inserted.

7. In an incubator: a series of egg-tray supports with supporting-surfaces graduated in height, so that the egg-trays may be raised or lowered by moving from one support to another, and having a second series of supporting-surfaces on a level and adapted to hold the egg-tray in substantially the same chambered positions.

8. In an incubator: a frame having doors on opposite sides; a foraminous wall mounted inside of one door; cloth hung inside of the other door; trays adapted to be inserted and removed through the door having the cloth; said cloth serving as a check-valve when the trays are removed or inserted.

9. In an incubator: a suitable structure having a door-opening; cloth hung inside of said opening; trays adapted to be inserted through said door-opening; said cloth serving as a check-valve when the trays are removed or inserted; a second door-opening on the opposite side; a door in said second opening and having an air-passage; a foraminous wall through which air must pass after entering said second opening; and means for regulating the air-passage.

10. In an incubator: a suitable structure having an incubator-chamber; and having a heating-chamber above the incubator-chamber; a heating device in the heating-chamber; a foraminous heat-distributing wall between the two chambers; said wall being lowest at a point directly under the heating device and highest at points remote from said heater, so as to give a uniform heat from the heating-chamber to the incubator-chamber.

11. In an incubator: a suitable structure having an incubator-chamber; a heating-drum mounted in the upper part of the structure; and a cloth wall below the heating-drum; said wall being the lowest at a point directly under said drum, so as to give a uniform heat from the heating-chamber to all parts of the incubator-chamber.

12. In an incubator: a suitable structure having an incubator-chamber; a heater mounted in the upper part of the structure and longitudinally thereof; and a cloth wall having its center below the heater; said wall being lower at the center than at its sides, so as to give a uniform heat from the heating-chamber to all parts of the incubator-chamber.

In testimony whereof I have signed my name to this specification in presence of two subscribing witnesses.

GEORGE HACKER.

Witnesses:
ALFRED A. EICKS,
F. C. CRISLER.